May 27, 1930.  H. I. BECKER  1,760,538
ASSEMBLY OF CABLES
Filed Sept. 8, 1927   2 Sheets-Sheet 1

Inventor:
Howard I. Becker,
by
His Attorney.

May 27, 1930.  H. I. BECKER  1,760,538
ASSEMBLY OF CABLES
Filed Sept. 8, 1927    2 Sheets-Sheet 2

Inventor:
Howard I. Becker,
by
His Attorney.

Patented May 27, 1930

1,760,538

UNITED STATES PATENT OFFICE

HOWARD I. BECKER, OF SCHENECTADY, NEW YORK, ASSIGNOR TO GENERAL ELECTRIC COMPANY, A CORPORATION OF NEW YORK

ASSEMBLY OF CABLES

Application filed September 8, 1927. Serial No. 218,344.

My invention relates to the assembly of cables for interconnecting the various parts of an electrical apparatus, and has for its principal object the provision of an improved apparatus and method of assembly whereby such a cable may be assembled with its terminals so spaced apart as to be readily connected to the terminals of the apparatus with which the cable is to be used.

In the manufacture of electrical apparatus provided with a plurality of terminals which are to be connected to one another or to external circuits, it is frequently desirable that the connections be made through a cable having the terminals of its various conductors so arranged as to be readily connected to the different terminals of the apparatus. Thus in the production of a radio set, for example, it is desirable that the cable for completeing the various connections have the proper number of conductors and that the terminals of these conductors be so arranged that the cable may be mounted on the bottom of the set with its terminals adjacent the corresponding terminals of the set. In accordance with my invention, these results are produced by an improved assembly apparatus which ensures that the terminals of the cable conductors are properly located with respect to one another and indicates when all the required conductors have been included in the cable.

My invention will be better understood from the following description when considered in connection with the accompanying drawings and its scope will be pointed out in the appended claims.

Figure 1:
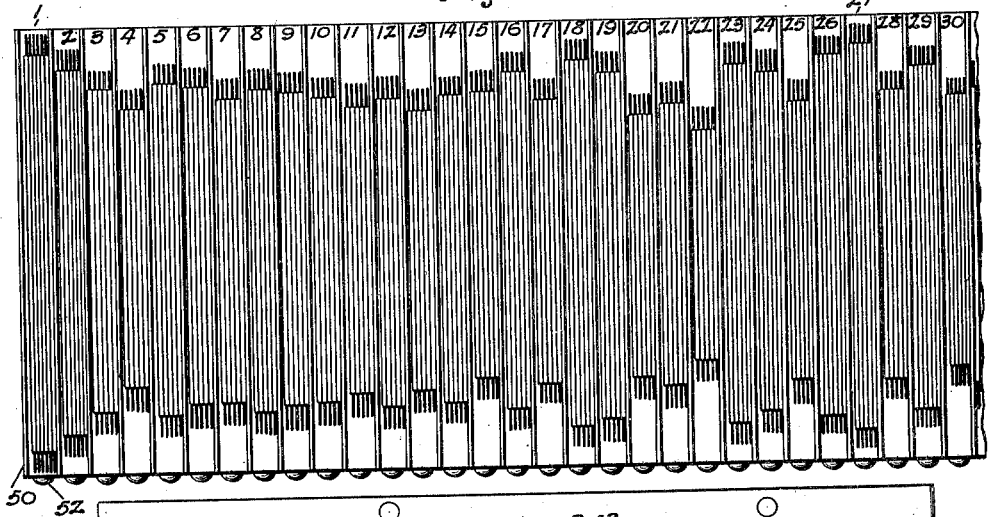
Figure 1:
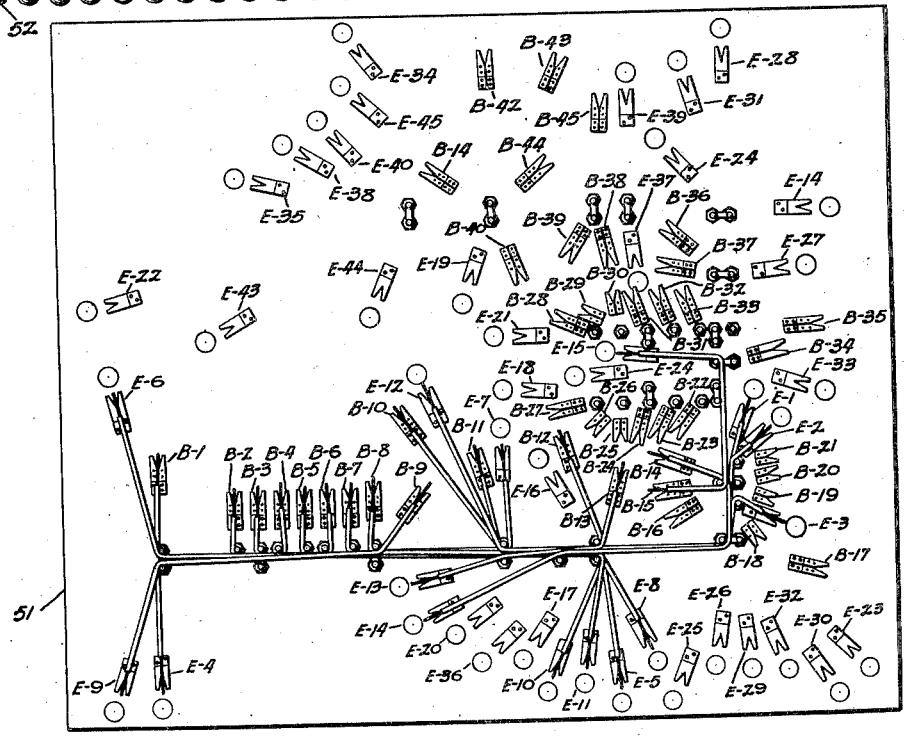
Figure 2:
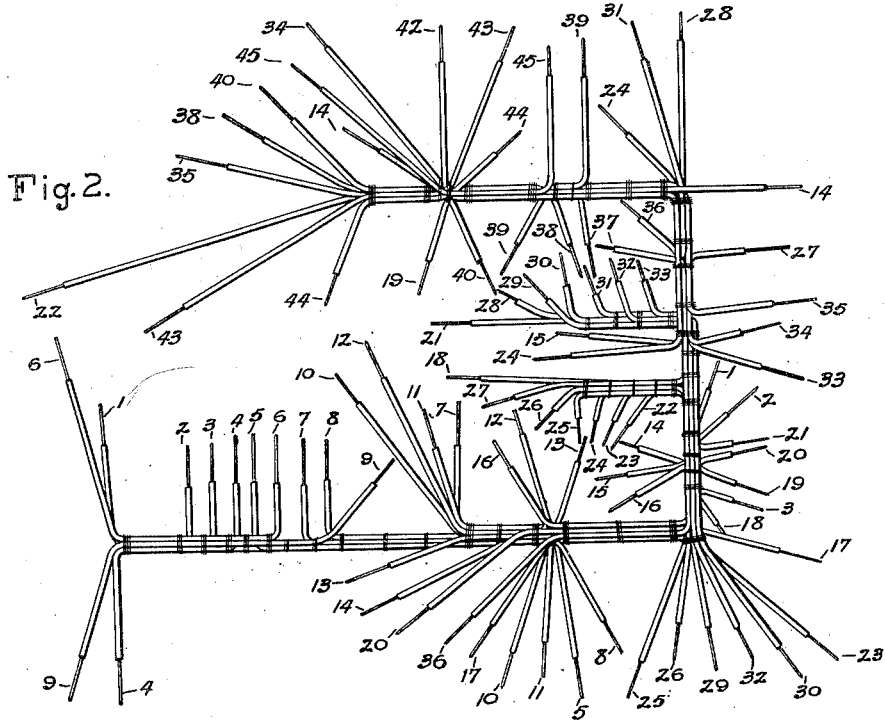
Figure 3:
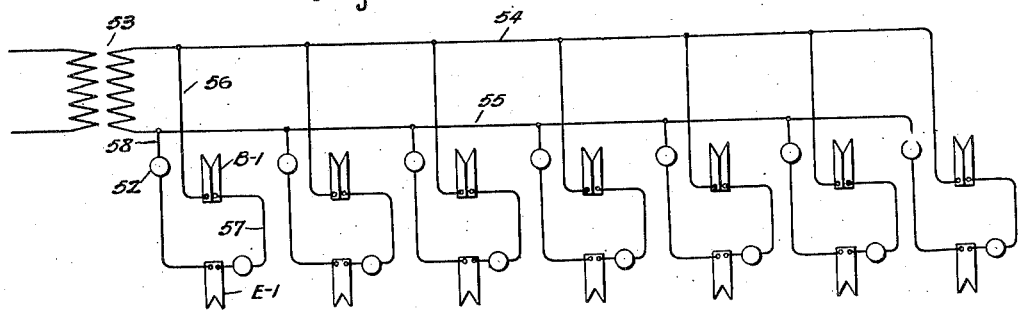
Figure 4:
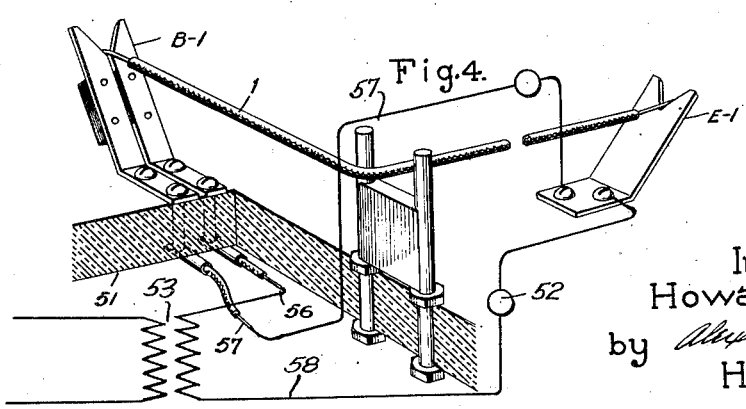

Referring to the drawings, Fig. 1 shows an assembly apparatus wherein my invention has been embodied; Fig. 2 shows a cable suitable for completing the connections of a radio set; and Figs. 3 and 4 show various details of the assembly apparatus shown by Fig. 1.

The assembly apparatus shown by Fig. 1 comprises a rack 50 provided with a plurality of troughs or receptacles 1 to 30 for holding the different conductors of the cable, and an assembly board 51 provided with starting and ending clips for receiving the ends of the conductors of the cable and with guides for forming the main body of the cable. In order to simplify the drawing, the rack 50 has been shown as comprising only thirty troughs, but it should be understood that the number of troughs in the rack will in each case correspond to the number of conductors in the cable and that each trough will contain a supply of conductors having the same length. On the assembly board, the starting clips and the ending clips may be distinguished from one another by the fact that a circle representing a signal light is placed near the notch of each ending clip. The complete assembly apparatus preferably comprises a starting and ending clip for each trough of the rack 1.

In making the cable, the conductors are cut to the proper lengths, the insulation is removed at the ends of the conductors, the ends of the conductors are tinned, and the conductors are placed in the rack 1 as indicated in Fig. 1. One tinned end of the conductor 1 is then placed in the clip B—1. This completes a connection through which a light at the ending clip E—1 is lighted and a positive indication of where the first conductor is to end is produced. The operator then lays the conductor between the various pairs of guides as indicated until the other tinned end of the conductor is brought into the notch of the ending clip E—1. Contact of the conductor with the ending clip E—1 extinguishes the light at E—1 and lights a lamp 52 which indicates that a conductor from the trough 1 has been used.

For each light at an ending clip, there is a corresponding light on the rack 1 which is lighted only when a conductor taken from the trough corresponding to the light has been included in the cable. When a conductor from each of the troughs has been included in the cable all the lights at the front of the rack are lighted, and a positive check on the number of conductors put into the cable is produced. The apparatus of Fig. 1 thus not only facilitates the assembly of the cable but also positively checks the cables that have gone into the cable so that no subsequent test of the cable is required.

The manner in which the ending clip lights and the rack lights are controlled will be readily understood upon consideration of Figs. 3 and 4. As indicated by these figures, current is supplied to the ending clip and rack lamps through a transformer 53 and busses 54 and 55. Thus current is supplied to the lamp at the ending clip E—1 through the bus 54, a lead 56, one side of the starting clip B—1, the end of the conductor 1, the other side of the starting clip B—1, a conductor 57, a conductor 58 which is connected to the ending clip E—1, rack lamp 52, a conductor 58, and the bus 55. It should be observed that the two sides of the starting clip B—1 are insulated from one another, that the circuit to the ending clip and rack lights is not completed until the tinned end of the conductor is inserted between the two insulated parts of the starting clip, and that the ending clip light has a comparatively high resistance as compared with the resistance of the corresponding rack light.

Under these conditions, the ending clip lamp is lighted when the end of the conductor is inserted between the two parts of starting clip but the corresponding rack lamp is not lighted until the ending clip lamp is short circuited by contact between the ending clip and the other end of the cable. Current for operating the various lamps of the apparatus may be supplied from either a direct or alternating current source, but alternating current is preferably for the reason that it is advisable to split up the control circuits as much as possible in order to prevent the conductors from causing the lamps to light in response to contact with the wrong clips. This difficulty is avoided by the provision of several secondary windings on the supply transformer.

The completion of the cable of course involves a repetition of the steps described in connection with the conductor 1 and will be understood without detailed explanation. As shown more clearly in Fig. 2, the cable illustrated comprises 45 conductors, the same reference numeral being placed at the two ends of each conductor. When the conductors are all in place, they are bound together and removed from the assembly table thus interrupting the connections of the rack lights. It will of course be apparent that the invention is applicable to cables which comprise different numbers of conductors and have their terminals so arranged with respect to one another as to be readily connected to the terminals of different kinds of apparatus.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:—

1. A cable assembly apparatus comprising means for supporting the different conductors to be included in the cable, a member comprising a starting and ending clip for each conductor, means adjacent each ending clip for indicating when one end of a conductor has been inserted in the corresponding starting clip, and means mounted on said conductor supporting means for indicating when the other end of said conductor is inserted in the indicated ending clip.

2. A cable assembly apparatus comprising means for supporting the different conductors to be included in the cable, a member comprising a starting and ending clip for each conductor, a lamp adjacent each ending clip and arranged to be lighted in response to the insertion of one end of a conductor in the corresponding starting clip, and means mounted on said conductor supporting means for indicating when the other end of said conductor is inserted in the indicated ending clip.

3. A cable assembly apparatus comprising means for supporting the different conductors to be included in the cable, a member comprising a starting and ending clip for each conductor, a lamp adjacent each ending clip and arranged to be lighted in response to the insertion of one end of a conductor in the corresponding starting clip, and a lamp arranged to be lighted in response to the insertion of the other end of said conductor into the indicated ending clip.

4. A cable assembly apparatus comprising a support member provided with a plurality of receptacles for receiving the different conductors to be included in the cable, a starting and ending clip for each conductor, means adjacent each ending clip for indicating when one end of a conductor has been inserted into the corresponding starting clip, and means mounted adjacent the receptacle from which said conductor has been removed for indicating when the other end of said conductor is inserted into the indicated ending clip.

5. A cable assembly apparatus comprising a support member provided with a plurality of receptacles for receiving the different conductors to be included in the cable, a starting and ending clip for each conductor, means adjacent each ending clip for indicating when one end of a conductor has been inserted into the corresponding starting clip, a plurality of lamps each mounted adjacent a different one of said receptacles, and means for completing the circuit of the lamp adjacent the receptacle from which said conductor has been removed when the other end of said conductor is inserted in said indicated ending clip.

6. The method of assembling a cable comprising conductors, each stored in a different receptacle, which comprises utilizing one end of each conductor to produce an indication of the point where the other end of said conductor is to be located, and utilizing the other end of said conductor to produce an indication of the receptacle from which said conductor has been removed.

7. An assembly apparatus including a support member provided with a plurality of receptacles for receiving the different parts of the apparatus to be assembled, means for positioning the opposite ends of each part as the apparatus is assembled, means for completing an electrical circuit whereby a signal is produced at one end of each part when the other end of said part is properly positioned, and means for completing a circuit whereby a signal is produced at the receptacle from which said part has been taken when both ends are properly positioned.

8. An assembly apparatus including current supply means, comparatively high and low resistance lamps, means for connecting said lamps to said supply means in series with one another when the end of one part is properly positioned with respect to the other parts of said apparatus, and means for connecting said low resistance lamp directly to said supply means when the other end of said part is properly positioned with respect to the other parts of said apparatus.

In witness whereof, I have hereunto set my hand this 7th day of September, 1927.

HOWARD I. BECKER.